United States Patent [19]

Ikeguchi et al.

[11] Patent Number: 4,499,245

[45] Date of Patent: Feb. 12, 1985

[54] CURABLE RESIN COMPOSITION

[75] Inventors: Nobuyuki Ikeguchi; Hidenori Kimbara, both of Tokyo, Japan

[73] Assignee: Mitsubishi Gas Chemical Company, Inc., Tokyo, Japan

[21] Appl. No.: 514,043

[22] Filed: Jul. 15, 1983

Related U.S. Application Data

[62] Division of Ser. No. 228,988, Jan. 27, 1981, Pat. No. 4,410,666.

[30] Foreign Application Priority Data

Jan. 29, 1980 [JP] Japan .................................. 55-9163

[51] Int. Cl.$^3$ .......................................... C08F 283/00
[52] U.S. Cl. ................................... 525/417; 525/185; 525/186; 525/419; 525/420; 525/908; 528/170; 528/172; 528/321; 528/322; 528/362; 528/363; 528/364; 528/423
[58] Field of Search .............. 525/417, 185, 186, 419, 525/420, 908; 528/170, 172, 362, 363, 364, 321, 322, 423

[56] References Cited

U.S. PATENT DOCUMENTS

| 3,448,079 | 6/1969 | Grigat et al. | 260/59 |
| 3,553,244 | 1/1971 | Grigat et al. | 260/453 |
| 3,562,214 | 2/1971 | Kubens et al. | 260/47 |
| 3,740,348 | 6/1973 | Grigat et al. | 260/453 AL |
| 3,755,402 | 8/1973 | Grigat et al. | 260/453 AL |
| 4,110,364 | 8/1978 | Gaku et al. | 528/170 |
| 4,206,104 | 6/1980 | Dowbenko et al. | 525/908 |
| 4,243,778 | 1/1981 | Heim et al. | 525/908 |

FOREIGN PATENT DOCUMENTS 1060933  3/1967  United Kingdom .

*Primary Examiner*—Jacob Ziegler
*Attorney, Agent, or Firm*—Fleit, Jacobson, Cohn & Price

[57] ABSTRACT

A curable resin composition comprising a mixture and/or a preliminary reaction product of (a) at least one cyanate compound selected from the group consisting of polyfunctional cyanate esters, prepolymers of the cyanate esters, coprepolymers of the cyanate esters and an amine and mixtures thereof, (b) a polyhydantoin resin and optionally (c) at least one maleimide compound selected from the group consisting of polyfunctional maleimides, prepolymer of the maleimides, coprepolymers of the maleimides and an amine and mixtures thereof is disclosed.

3 Claims, No Drawings

CURABLE RESIN COMPOSITION

This is a divisional of application Ser. No. 228,988 filed Jan. 27, 1981, now U.S. Pat. No. 4,410,666.

BACKGROUND OF THE INVENTION

This invention relates to a curable resin composition comprising a mixture and/or a preliminary reaction product of (a) a polyfunctional cyanate ester, prepolymer of the cyanate ester or coprepolymer of the cyanate ester and an amine (sometimes hereinunder referred to as component (a)) and (b) polyhydantoin resin (sometimes hereinunder referred to as component (b)) and also relates to a curable resin composition comprising a mixture and/or a preliminary reaction product of component (a), component (b) and (c) a polyfunctional maleimide, prepolymer of the maleimide or coprepolymer of the maleimide and an amine (sometimes hereinunder referred to as component (c)).

Polyhydantoin resins have good water resistance, and are commercially available as an enamel varnish or in the form of film. However, solvent-resistance of the resin is slightly poor and heat-resistance thereof is somewhat unsatisfactory. In addition, it is not suitable to make laminate from the resin. On the other hand, cyanate ester resins are slightly poor in respect of water-resistance. Cyanate ester-maleimide resins were developed in order to improve the above shortcoming of the cyanate ester resin. Flex resistance of the cyanate ester-maleimide resin is too low for the resin to be used as an enamel.

SUMMARY OF THE INVENTION

The present inventors carried out research for obtaining a cured resin having excellent resistance and excellent adherence to the substrate. As a result it was found that when a curable resin composition comprising a mixture and/or a preliminary reaction product of (a) a polyfunctional cyanate ester, prepolymer of the cyanate ester or coprepolymer of the cyanate ester and an amine, and (b) polyhydantoin resin or a curable resin composition comprising a mixture and/or a preliminary reaction product of above component (a), above component (b) and (c) a polyfunctional maleimide, prepolymer of the maleimide or coprepolymer of the maleimide and an amine is cured, a cured resin having the above-mentioned desirable properties can be obtained. This invention is based on this discovery.

DETAILED DESCRIPTION OF THE INVENTION

By polyfunctional cyanate ester is meant a compound having at least two cyanate groups in its molecule. The polyfunctional cyanate ester is represented by the formula $$R^1\text{+O}-C\equiv N)_m$$

wherein $R^1$ is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R^2$ and $R^3$ are the same or different and each represents a hydrogen atom or an alkyl group containing 1 to 4 carbon atoms, $$-O-, -CH_2OCH_2-, -S-, -\underset{\underset{O}{\|}}{C}-, -O-\underset{\underset{O}{\|}}{C}-O-, -\underset{\underset{O}{\|}}{\overset{\overset{O}{\|}}{S}}-,$$

$$-\underset{\underset{O}{\|}}{\overset{\overset{O}{\|}}{S}}-, -O-\underset{\underset{O}{|}}{\overset{\overset{O}{|}}{P}}-O- \text{ and } -O-\underset{\underset{O}{|}}{\overset{\overset{O}{\|}}{P}}-O-;$$

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide, cyanated bisphenol-type polycarbonate oligomer produced by reacting a bisphenol-type polycarbonate oligomer with cyanogen halide, derived from bisphenol type polycarbonate oligomer and mixture thereof. Other cyanate esters employed in the practice of this invention are given in Japanese Patent Publication Nos. 1928/1966, 4791/1969, 11712/1970 and 41112/1971 and Japanese Patent Publication (laid open) No. 63149/1976 which are incorporated herein for references. The above-mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or a Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

By polyhydantoin resin is meant a resin having a hydantoin ring in the main chain and having the following repeating units

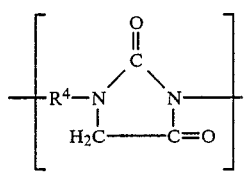

wherein $R^4$ is $R^1$ or imide ring. The polyhydantoin resins are commercially available from Bayer AG as Resistfol or Resistherm.

The ratio of component (a) and component (b) is not critical. The ratio by weight of component (a) to component (b) may be in the range of from 99:1 to 1:99, preferably from 95:5 to 35:65.

When component (c) is used with components (a) and (b), the heat resistance of the cured resin is further improved.

The polyfunctional maleimides employed in the present invention are organic compounds having two or more maleimide groups derived from maleic anhydride and a polyamine and are represented by the following general formula

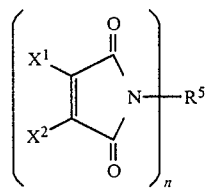

wherein $R^5$ represents divalent to pentavalent aromatic or alicyclic organic group, each of $X^1$ and $X^2$ represent a hydrogen atom, halogen atom or alkyl group, and n represent integer of 2-5.

The maleimides represented by the above formula can be produced by a method known per se which involves reacting maleic anhydride with polyamine to form a maleamide acid, and then dehydro-cyclizing the maleamide acid.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above-mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The curable composition of this invention may be prepared by merely mixing the above-mentioned components (a) and (b) or components (a), (b) and (c) or by using the product of preliminary reaction of these components.

The curable composition of this invention comprises a mixture and/or a preliminary reaction product of (a) at least one compound selected from the group consisting of polyfunctional cyanate esters, prepolymers of the cyanates esters or coprepolymers of the cyanate esters and an amine and (b) polyhydantoin resin and optionally (c) at least one compound selected from the group consisting of polyfunctional maleimides, prepolymers of the maleimides and coprepolymers of the maleimides and an amine and/or (d) other component. The composition may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof. Other components (d) include epoxy resins; (meth)acrylates, such as methacrylates, acrylates, methacrylic epoxy esters, acrylic epoxy esters, methacrylic alkenyl esters, acrylic alkenyl esters, its prepolymers; polyallyl compounds, such as diallyl phthalate, divinylbenzene, diallylbenzene, trialkenyl isocyanulates or its prepolymers, phenol resins; polyvinyl acetal resins, such as polyvinyl formal, polyvinyl acetal, or polyvinyl butyral; acrylic resins, silicone resins, or alkyd resins having OH group or COOH group; liquid or elastic rubbers, such as polybutadiene, butadiene-acrylonitrile copolymer, polychloroprene, butadiene-styrene copolymer, polyisoprene or natural rubbers; polyamido-imide resins; polyester imide resins and polyesteramideimide resin, polyparavanic acid.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2- methylimidazole and addition produce of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methylmorpholine, triethanolamine, triethylenediamine, N,N,N',N'-tetramethylbutanediamine, N-methylpiperidine; phenols, such as phenol, cresol, xylenol, resorcine, and phloroglucin, organic metal salts, such as lead naphthenate, lead stearate, zinc naphthenate, zinc octoate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride, hexahydropyromellitic anhydride and hexahydrotrimellitic anhydride; azo compounds, such as azoisobutylonitrile, 2,2'-azobispropane, m,n'-azoxystyrene, hydrozones, and mixtures thereof.

In addition to the above-mentioned catalysts, a curing agent for epoxy resin and a curing catalyst for epoxy resin may be used as a catalyst of this invention.

The amount of the catalyst employed may be less than 5% by weight of total composition.

A variety of additives may be added to the curable composition to impact specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the natures of the components constituting the composition, and the preliminary reaction conditions. Solid curable composition, liquid curable composition or solution of the composition in solvent may be used according to the use purpose.

The curing conditions of the curable composition of this invention depend on proportion of components constituting the composition and the nature of the components employed. In general, the composition of this invention may be cured by heating it at a temperature within the range of 100°–250° C.

When the curable composition of this invention is used for preparing molding, laminate, adhesive-assembly, press means is preferably applied to the molding, laminate or adhesive-assembly in the heat curing step. In general, these products may be pressed at a superpressure of 1–500 Kg/cm².

The composition of this invention is rapidly curable and is cured even under mild conditions, so is especially suitable when quantity production and ease of workability are desired. The cured resin made from the composition not only has excellent adhesive force, heat resistance, and electric properties, but also is excellent in mechanical properties, such as flex-cracking resistance, chemical resistance, moisture resistance and the like. The composition of this invention has a variety of uses as a coating materials for rust prevention, flame resistance, flame retardance and the like; as electrical insulating varnish; as adhesive; in laminates to be used for furnitures, building materials, sheathing materials, electircal insulating materials, and the like; and in a variety of moldings.

The present invention is further illustrated by the following non-limiting Examples and Comparative Examples. Percent and parts are by weight, unless otherwise specified.

EXAMPLE 1

2,2-Bis(4-cyanatophenyl)propane (100 g) was preliminarily polymerized at 150° C. for 450 minutes. The resulting prepolymer was dissolved in N,N-dimethylformamide. Zinc octoate (0.05 g) was added to the prepolymer. Polyhydantoin resin (solid content of 900 g) which is commercially available from Bayer AG as Resistfol was dissolved in methylene chloride. The two solutions mixed. The mixed solution was coated on a copper wire and cured thereon by heating. Properties of the coating film are shown in Table 1.

EXAMPLE 2

2,2-Bis(4-cyanatophenyl)propane (920 g), bis(4-maleimidophenyl)methane (64 g) and mixture (16 g) of 4-maleimidophenyl-3',4'-dimaleimidophenylmethane and 4-maleimidophenyl-2',4'-dimaleimidophenylmethane were preliminarily reacted at 145° C. for 75 minutes. The resulting prepolymer was added to polyhydantoin resin (solid content of 200 g) which is commercially available from Bayer AG as Resistherm. The resulting mixture was dissolved in mixed solvent of methyl ethyl ketone and N,N-dimethylformamide. Zinc octoate (0.4 g) was added to the resulting solution. The solution was coated on a copper wire. Properties of the coating film are shown in Table 1.

COMPARATIVE EXPERIMENT 1

For comparison, a polyhydantoin resin solution was coated on a copper wire. Properties of the coating film are shown in Table 1.

TABLE 1

|  | Example 1 | Example 2 | Comparative Experiment 1 |
|---|---|---|---|
| wire size (mm) | 1,000 | 1,000 | 1,000 |
| coating thickness (mm) | 0.045 | 0.041 | 0.041 |
| abrasion resistance (time) two-way, load = 600 g | 209 | 250 | 190 |
| dielectric breakdown | good | good | good |
| Chemical resistance (immersion for 3 days) | | | |
| methyl ethyl ketone | no change | no change | no change |
| N,N—dimethyl formamide | no change | no change | changed slightly |
| N—methyl-2-pyroridone | no change | no change | changed slightly |
| methylene chloride | no change | no change | no change |

EXAMPLE 3

2,2-Bis(4-cyanotophenyl)ether (900 g) and bis(4-maleimidophenyl)methane (100 g) were preliminarily reacted at 150° C. for 90 minutes. The resulting prepolymer was added to polyhydantoin resin (solid content of 200 g) Resistfol). To the resulting mixture were added 200 g of novolak type epoxy resin which is commercially available from Ciba Geigy as ECN 1280 catalyst comprising 0.5 g of zinc octoate, 0.1 g of catechol and 0.3 g of triethylene diamine. The mixture was milled uniformly, and pulverized. The resulting powder was adhered to glass cloth by fluidized bed coating, and melted with heat to obtain B-staged prepreg.

Seven prepreg sheets were stacked and sandwiched between two sheets of copper foil with 35μ thickness. The laminate was laminate-molded at 40 Kg/cm² at 175° C. for 150 minutes to obtain copper-clad laminate. The physical properties of the copper-clad laminate are shown in Table 2.

COMPARATIVE EXPERIMENT 2

B-staged prepreg was prepared from polyhydantoin resin in the same way as in Example 3. Though seven prepregs were stacked, sandwiched between two sheets of copper foil with 35μ thickness and molded at 40 Kg/cm² at 175° C. for 150 minutes, copper-clad laminate could not be prepared.

TABLE 2

|  |  | Example 3 |
| --- | --- | --- |
| peel strength of copper foil with 35μ thickness (Kg/mm²) | 25° C. | 1.70 |
|  | 200° C. | 1.50 |
| glass transition temperature (°C.) |  | 251 |
| flexural strength (Kg/mm²) | 25° C. | 72 |
|  | 200° C. | 61 |
| chemical resistance (immersion for 10 hrs.) | 20% HCl | no change |
|  | 20% NaOH | no change |

What is claimed is:

1. A curable resin composition comprising:
   (a) at least one cyanate ester compound selected from the group consisting of:
   (1) a polyfunctional aromatic cyanate ester monomer having the formula:

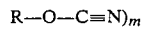

where m is 2 to 5 and R is an aromatic organic group, the cyanate groups being bonded to an aromatic ring of said aromatic organic group,
   (2) a prepolymer of one or more of said cyanate ester monomer, said prepolymer containing a sym-triazine ring and having an average molecular weight in the range of about 400 to 6,000, and
   (3) a coprepolymer of said cyanate ester monomer and an amine;
   (b) a polyhydantoin resin having a hydantoin ring in the main chain and having the following repeated units:

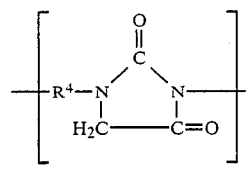

(c) at least one compound selected from the group consisting of:
   (1) a polyfunctional maleimide,
   (2) a homoprepolymer of one or more of said maleimide, and
   (3) a coprepolymer of said maleimide and an amine, said composition including a mixture of components the (a), the (b), and the (c), a preliminary reaction product of components the (a), the (b), and the (c), a combination of said mixture and said preliminary reaction product, a composition of the (a) an a preliminary reaction product of the (b) and the (c), a combination of the (b), and a preliminary reaction product of the (a) and the (c), or a combination of the (c) and a preliminary reaction product of the (a) and the (b).

2. The composition as defined in claim 1 wherein the cyanate ester is selected from the group consisting of 1,3-, 1,4-dicyanatobenzene; 1,3,5-tricyanatobenzene; 1,3-, 1,4- 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenol type polycarbonate oligomer produced by reacting a bisphenol type polycarbonate oligomer and mixture thereof.

3. The composition as defined in claim 1 wherein the ratio by weight of component (a) to component (b) is in the range of from 99:1 to 1:99.

* * * * *